United States Patent
Lin et al.

(10) Patent No.: US 10,056,855 B2
(45) Date of Patent: Aug. 21, 2018

(54) VARIABLE-FREQUENCY MOTOR DEVICE AND FAN THEREOF

(71) Applicant: DELTA ELECTRONICS, INC., Taoyuan Hsien (TW)

(72) Inventors: Hsin-Chih Lin, Taoyuan Hsien (TW); Lee-Long Chen, Taoyuan Hsien (TW); Kun-Chou Lee, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 575 days.

(21) Appl. No.: 13/945,199

(22) Filed: Jul. 18, 2013

(65) Prior Publication Data

US 2014/0227108 A1    Aug. 14, 2014

Related U.S. Application Data

(63) Continuation-in-part of application No. 13/944,381, filed on Jul. 17, 2013, now Pat. No. 9,103,348.

(30) Foreign Application Priority Data

Feb. 8, 2013 (TW) .............................. 102105119 A
May 24, 2013 (TW) .............................. 102118363 A

(51) Int. Cl.
*H02P 7/06* (2006.01)
*F04D 27/00* (2006.01)
*F04D 25/10* (2006.01)

(52) U.S. Cl.
CPC .............. *H02P 7/06* (2013.01); *F04D 25/105* (2013.01); *F04D 27/004* (2013.01)

(58) Field of Classification Search
CPC ...... H02P 7/06; H02P 7/20; H02P 1/30; H02P 1/52; H02P 23/28; H02P 27/04; F04D 25/105; F04D 27/004
USPC ......................................... 318/503, 606, 723
See application file for complete search history.

(56) References Cited

U.S. PATENT DOCUMENTS 3,684,170 A * 8/1972 Roof ...................... F24F 11/025
                                                          236/38
4,392,099 A * 7/1983 Kuniyoshi ................ H02P 6/20
                                                          318/797
7,841,837 B2 * 11/2010 Chen .................. H05K 7/20209
                                                          307/139

(Continued)

FOREIGN PATENT DOCUMENTS

GB         1199469 A *   7/1970    .............. H02P 25/20
JP         3011725 A1 *  4/1989

*Primary Examiner* — Dominick L Plakkoottam
*Assistant Examiner* — Philip Stimpert
(74) *Attorney, Agent, or Firm* — Muncy, Geissler, Olds & Lowe, P.C.

(57) ABSTRACT

A variable-frequency motor device that runs on alternating current includes a first converting circuit, a second converting circuit, and a DC variable-frequency motor. An operation module is coupled to the variable-frequency motor device, and provides the alternating current to the first or second converting circuit. The first converting circuit receives the alternating current, and generates a first rotation-speed signal. The second converting circuit receives the alternating current, and generates a second rotation-speed signal. The DC variable-frequency motor is driven at a rotation speed according to the first or second rotation-speed signal.

9 Claims, 5 Drawing Sheets

(56) References Cited

U.S. PATENT DOCUMENTS

2005/0088127 A1* 4/2005 Chiu ........................ H02P 6/08
318/400.29

* cited by examiner

VARIABLE-FREQUENCY MOTOR DEVICE AND FAN THEREOF

CROSS-REFERENCE TO RELATED APPLICATIONS

This application is a Continuation-In-Part of pending U.S. patent application Ser. No. 13/944, 381, filed on Jul. 17, 2013, which claims priority of Taiwan Patent Application No. 102105119, filed on Feb. 8, 2013, the entirety of which is incorporated by reference herein. This application further claims priority of Taiwan Patent Application No. 102118363, filed on May 24, 2013, the entirety of which is incorporated by reference herein.

BACKGROUND OF THE INVENTION

Field of the Invention

The present invention relates to a motor device, and in particular to a variable-frequency motor device that runs on alternating current.

Description of the Related Art

Due to the popularity of environmental friendliness, users desire electric equipment with low power consumption. However, most electric equipment uses AC (alternating current) motors with high power consumption. As shown in FIG. 1, a conventional AC fan A1 includes an AC motor device A10, a housing A20, an impeller A30, an operation module A40, and a connector A50. The AC motor device A10 is disposed in the housing A20, and includes an AC motor A11 and a connector A12 coupled to the AC motor A11. The impeller A30 pivots on the AC motor A11, and is driven by the AC motor A11. The operation module A40 may be a mechanical switch disposed on the housing A20. The operation module A40 may be electrically connected to the connector A12 by the connector A50.

When a manufacturer wants to manufacture a fan with a DC (direct current) motor, a redesign of the circuitry and wiring is needed, and some new parts may be needed, such as a new housing or a new switch. Thus, the manufacturing cost of the fan with a DC motor is high, decreasing consumer demand.

BRIEF SUMMARY OF THE INVENTION

To solve the problems of the prior art, the present disclosure provides a variable-frequency motor device to replace the AC (alternating current) motor of an AC fan, and then the manufacturing cost of a fan with a DC motor can be decreased.

The present disclosure provides a variable-frequency motor device that runs on alternating current and is coupled to an operation module. The variable-frequency motor device includes a first converting circuit and a second converting circuit. The first converting circuit includes a first rectifier circuit and a first modulator module. The first rectifier circuit receives the alternating current and generates a first direct current. The first modulator module generates a first rotation-speed signal according to the alternating current. The second converting circuit includes a second rectifier circuit and a second modulator module. The second rectifier circuit receives the alternating current and generates a second direct current. The second modulator module generates a second rotation-speed signal according to the alternating current. The DC motor receives the first direct current or the second direct current, and is driven at a corresponding rotation speed according to the first rotation-speed signal or the second rotation-speed signal. The operation module selectively applies the alternating current to the first converting circuit or the second converting circuit.

The present disclosure provides a fan including the described variable-frequency motor device, an operation module, and an impeller. The operation module is coupled to the variable-frequency motor device. The impeller pivots on the DC motor of the variable-frequency motor device. When the operation module is located at the first rotation-speed position, the DC motor drives the impeller to rotate at a first rotation speed according to the first rotation-speed signal. When the operation module is located at the second rotation-speed position, the DC motor drives the impeller to rotate at a second rotation speed according to the second rotation-speed signal.

The present disclosure provides a fan that runs on alternating current and that includes a variable-frequency motor device, an operation module and an impeller. The variable-frequency motor device includes a converting circuit and a DC motor. The converting circuit includes a rectifier circuit and a modulator module. The rectifier circuit receives the alternating current and generates a direct current. The modulator module receives the alternating current and generates an initial signal. The DC motor receives the direct current. The operation module is coupled to the modulator module, and receives the initial signal. The impeller pivots on the DC motor. The operation module transforms the initial signal to the rotation-speed signal according an operation event. The DC motor is driven at a corresponding rotation speed according to the rotation-speed signal, and drives the rotating impeller.

In conclusion, the fan of the present disclosure is made by replacing the AC motor in the AC fan with the variable-frequency motor device, and thus the manufacturing cost of the fan is decreased.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2:
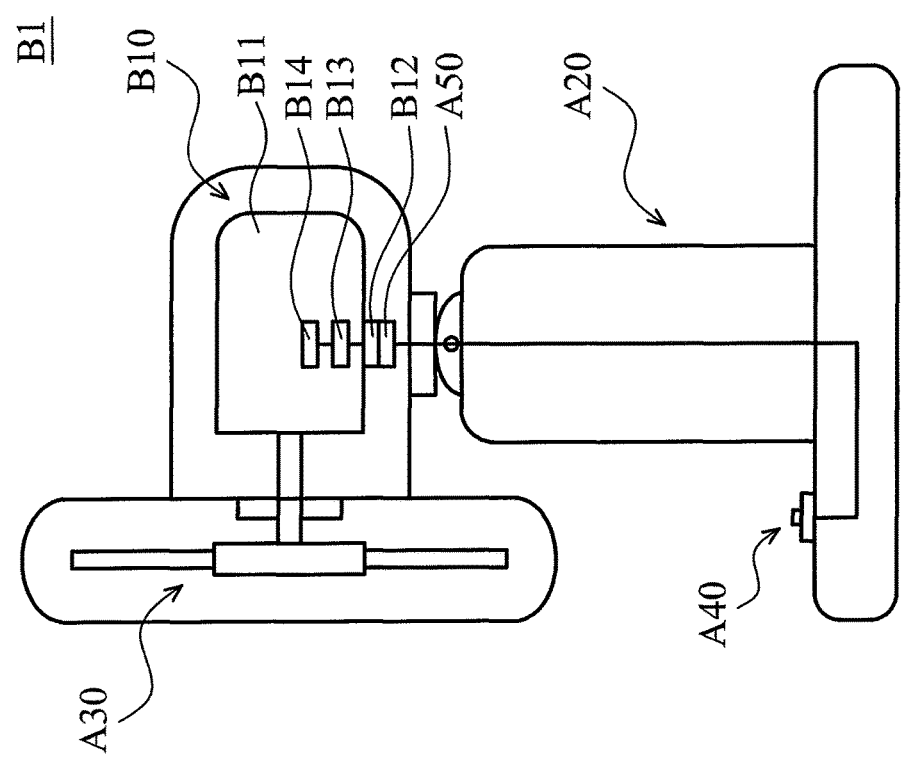
FIG. 2 is a schematic view of a fan according to the present disclosure.

FIG. 2 is a schematic view of a fan B1 according to the present disclosure. The fan B1 may be any type of equipment that includes a fan or fans, such as a household fan, a range hood, an air conditioner, a turbine engine, or an electrical generator. In this embodiment, the fan B1 is a household fan. The fan B1 includes a variable-frequency motor device B10, a housing A20, an impeller A30, an operation module A40, and a connector A50. The variable-frequency motor device B10 is disposed in the housing A20, and includes a DC motor B11, a connector B12, a power control module B13, and a motor controller B14. In the embodiment, the DC motor B11 is for direct current, and is driven at different rotation speeds according to the current or the voltage of different direct currents. For example, the DC motor B11 may be a DC brushless motor, or it may be a single-phase motor, a three-phase motor, or a multi-phase motor, but it is not limited thereto.

The connector B12 is coupled to the power control module B13, and the power control module B13 is coupled to the DC motor B11 and the motor controller B14. In the embodiment, the power control module B13 and the motor controller B14 are disposed on the DC motor B11. The impeller A30 pivots on the DC motor B11, and is driven by the DC motor B11. The operation module A40 may be a mechanical switch disposed on the housing A20. The operation module A40 may be coupled to the connector A50 via a wire. The connector A50 is plugged to the connector B12, and thus the operation module A40 is electrically connected to the power control module B13 by the connector A50 and the connector B12.

Figure 1:
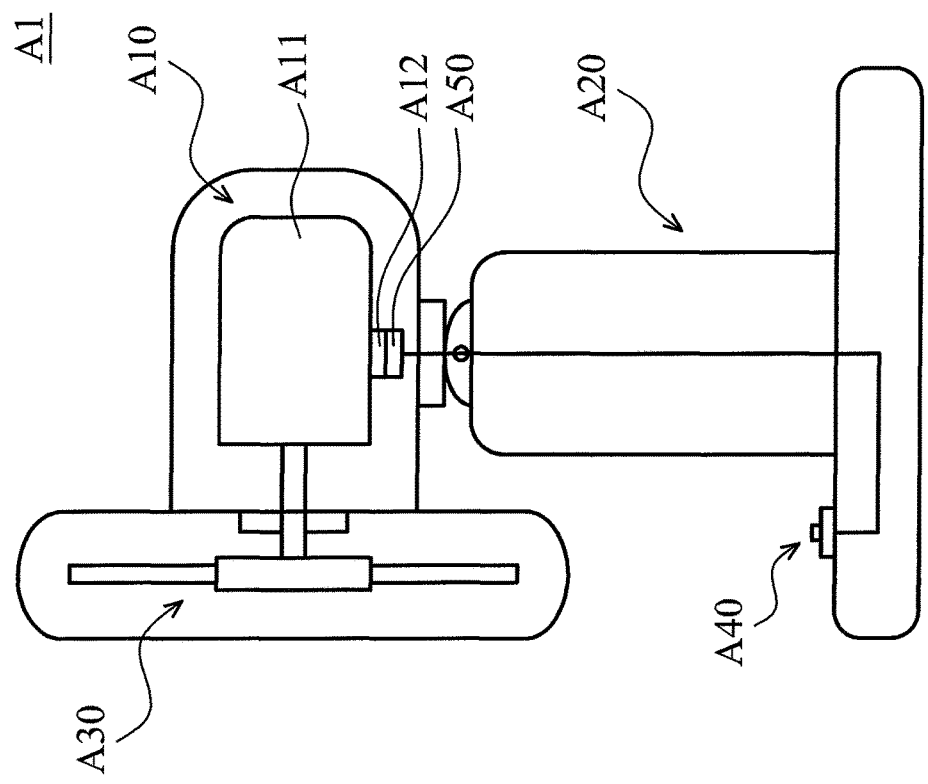
FIG. 1 is a schematic view of a conventional AC fan.

As shown in FIG. 2, some elements, such as the housing A20, the impeller A30, the operation module A40, the connector A50, and/or the connector B12 of the embodiment, may be the same as the elements of the AC fan A1 as shown in FIG. 1, and no redesign of the elements is needed. Thus, a manufacturer may upgrade the conventional AC fan A1 to the fan B1 of the present disclosure by removing the conventional AC motor device A10 in the AC fan A1, installing the variable-frequency motor device B10 of the embodiment into the housing A20, and connecting the connector B12 to the connector A50. Thus, the manufacturing cost of the fan B1 is greatly decreased. Moreover, since the DC motor B11 only requires about half of the power of that of the AC motor A11, the DC motor B11 saves power and is environmentally friendly.

Figure 3:
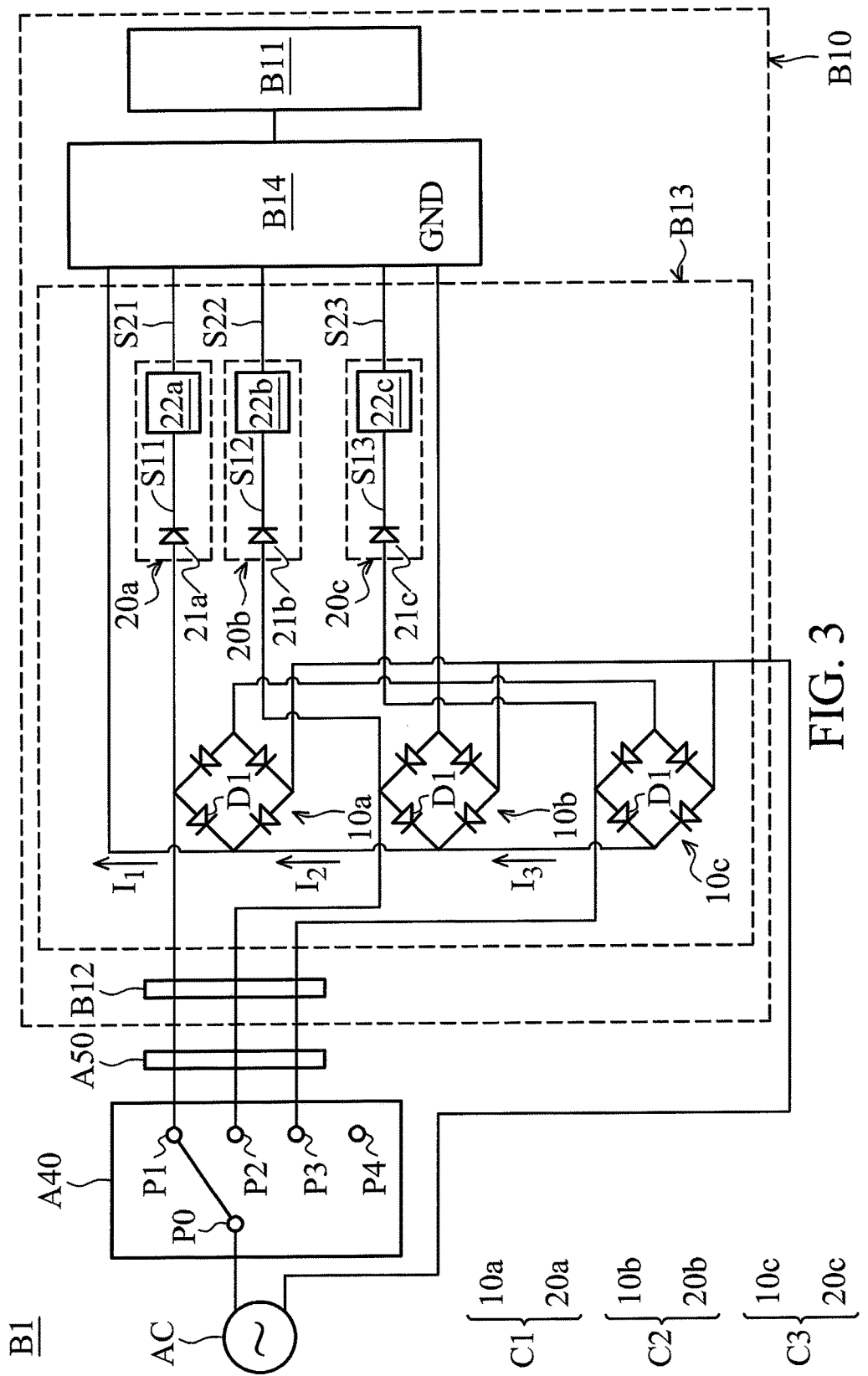
FIG. 3 is a circuit diagram of the fan according to a first embodiment of the present disclosure.

FIG. 3 is a circuit diagram of the fan B1 according to a first embodiment of the present disclosure. The operation module A40 is coupled to an AC power source AC and receives alternating current from the AC power source AC. The operation module A40 may be a mechanical switch. The contact point P0 may be selectively coupled to a contact point P1, P2, P3, or P4 by rotating or pressing the operation module A40. When the contact point P0 is coupled to the contact point P4, the operation module A40 stops applying the alternating current to the variable-frequency motor device B10. The connector A50 is coupled to the operation module A40, and the connector B12 is plugged into and electrically connected to the connector A50.

The power control module B13 includes a first converting circuit C1, a second converting circuit C2, and a third converting circuit C3. The first converting circuit C1 is coupled to the contact point P1 of the operation module A40 and the motor controller B14. The second converting circuit C2 is coupled to the contact point P2 of the operation module A40 and the motor controller B14. The third converting circuit C3 is coupled to the contact point P3 of the operation module A40 and the motor controller B14. Namely, each of the converting circuits corresponds to one of the contact points of the operation module A40. Thus, the alternating current is selectively applied to the first, second, or third converting circuit C1, C2, or C3 via the operation module A40. For example, when the contact point P0 is coupled to the contact point P1, the alternating current is applied to the first converting circuit C1 via the operation module A40.

In the embodiment, there are three converting circuits and contact points as an example. However, the numbers of converting circuits and contact points are not limited. Moreover, the circuit structure or function of the second converting circuit C2 and the third converting circuit C3 may be the same as the first converting circuit C1. Therefore, further detailed descriptions of the second converting circuit C2 and the third converting circuit C3 are omitted for brevity.

The first converting circuit C1 includes a first rectifier circuit 10a and a first modulator module 20a. The first rectifier circuit 10a may be a bridge rectifier including four diodes D1.

The first rectifier circuit 10a is coupled to the contact point P1 of the operation module A40 via the connector B12 and the connector A50. The first rectifier circuit 10a is coupled to the AC power source AC and the first modulator module 20a. The first rectifier circuit 10a receives the alternating current from the AC power source AC and applies a first direct current I1 to the motor controller B14.

The first modulator module 20a includes a first diode 21a and a first modulator circuit 22a. The first diode 21a is coupled to the contact point P1 of the operation module A40 via the connector B12 and the connector A50. The first modulator module 20a is coupled to the first rectifier circuit 10a and the first modulator circuit 22a. The first diode 21a receives the alternating current and applies a first trigger signal S11 to the first modulator circuit 22a.

The first modulator circuit 22a may be a pulse-width modulation (PWM) circuit, a voltage-divider circuit, or an operation-amplifier circuit. The first modulator circuit 22a is coupled to the first diode 21a and the motor controller B14. The first modulator circuit 22a receives the first trigger signal S11 and applies a first rotation-speed signal S21 to the motor controller B14.

The second converting circuit C2 includes a second rectifier circuit 10b and a second modulator module 20b. The second rectifier circuit 10b receives the alternating current and applies a second direct current I2 to the motor controller B14. The second modulator module 20b includes a second diode 21b and a second modulator circuit 22b. The second diode 21b receives the alternating current and applies a second trigger signal S12 to the second modulator circuit 22b. The second modulator circuit 22b receives the second trigger signal S12 and applies a second rotation-speed signal S22 to the motor controller B14.

The third converting circuit C3 includes a third rectifier circuit 10c and a third modulator module 20c. The third rectifier circuit 10c receives the alternating current and applies a third direct current I3 to the motor controller B14. The third modulator module 20c includes a third diode 21c and a third modulator circuit 22c. The third diode 21c receives the alternating current and applies a third trigger signal S13 to the third modulator circuit 22c. The third modulator circuit 22c receives the third trigger signal S13 and applies a third rotation-speed signal S23 to the motor controller B14.

In the embodiment, the first, second and third trigger signals S11, S12 and S13 have voltages which are the same as the alternating current, such as 110V (or 220V). The first, second and third modulator circuits 22a, 22b and 22c change the voltages of the first, second, and third trigger signals S11, S12, and S13 to give the first, second, and third rotation-speed signals S21, S22 and S23 different voltages. Namely, the voltages of the first, second and third trigger signals S11, S12 and S13 are different from the voltages of the first, second and third rotation-speed signals S21, S22 and S23. For example, the voltages of the first, second and third rotation-speed signals S21, S22 and S23 are 5V, 3V and 2V.

The motor controller B14 is coupled to the DC motor B11. The motor controller B14 receives the first, second and third direct currents I1, I2 and I3 and the first, second and third rotation-speed signals S21, S22 and S23 to drive the DC motor B11. Moreover, the motor controller B14 has a ground terminal GND coupled to the first, second and third rectifier circuits 10a, 10b and 10c. In the embodiment, since the motor controller B14 is conventional art, a further detailed description is omitted for brevity.

The DC motor B11 receives the first, second or third direct current I1, I2 or I3, and is driven at a rotation speed corresponding to the first, second or third rotation-speed signal S21, S22 or S23. In the embodiment, when the operation module A40 is located at a first rotation-speed position, the contact point P0 is coupled to the contact point P1. Next, the operation module A40 applies the alternating current to the first converting circuit C1. Thus, the DC motor B11 receives the first direct current I1, and is driven at a corresponding rotation speed, such as 5000 revolutions per second, according to the first rotation-speed signal S21.

When the operation module A40 is located at a second rotation-speed position, the contact point P0 is coupled to the contact point P2. The operation module A40 applies the alternating current to the second converting circuit C2. Thus, the DC motor B11 receives the second direct current I2, and is driven at a corresponding rotation speed, such as 3000 revolutions per second, according to the second rotation-speed signal S22.

When the operation module A40 is located at a third rotation-speed position, the contact point P0 is coupled to the contact point P3. Next, the operation module A40 applies the alternating current to the third converting circuit C3. Thus, the DC motor B11 receives the third direct current I3, and is driven at a corresponding rotation speed, such as 2000 revolutions per second, according to the third rotation-speed signal S23. Therefore, the DC motor B11 may be driven at different rotation speeds by operating the operation module A40.

In the embodiment, the DC motor B11 may be driven at different rotation speeds because the voltages of the first, second and third rotation-speed signals S21, S22 and S23 are different. Further, the voltages of the first, second and third rotation-speed signals S21, S22 and S23 are adjusted by the first, second and third modulator circuits 22a, 22b and 22c. For example, a manufacturer may replace or adjust the first, second and third modulator circuits 22a, 22b and 22c to change the voltages of the first, second and third rotation-speed signals S21, S22 and S23. Thereby, the rotation speeds of the DC motor B11 can be adjusted without replacing the entire power control module B13 and the motor controller B14. Moreover, the variable-frequency motor device B10 may be one that runs on alternating current with a different voltage by adjusting the voltages of the first, second and third rotation-speed signals S21, S22 and S23. Thus, the manufacturing cost of the fan B1 is decreased.

Figure 4:
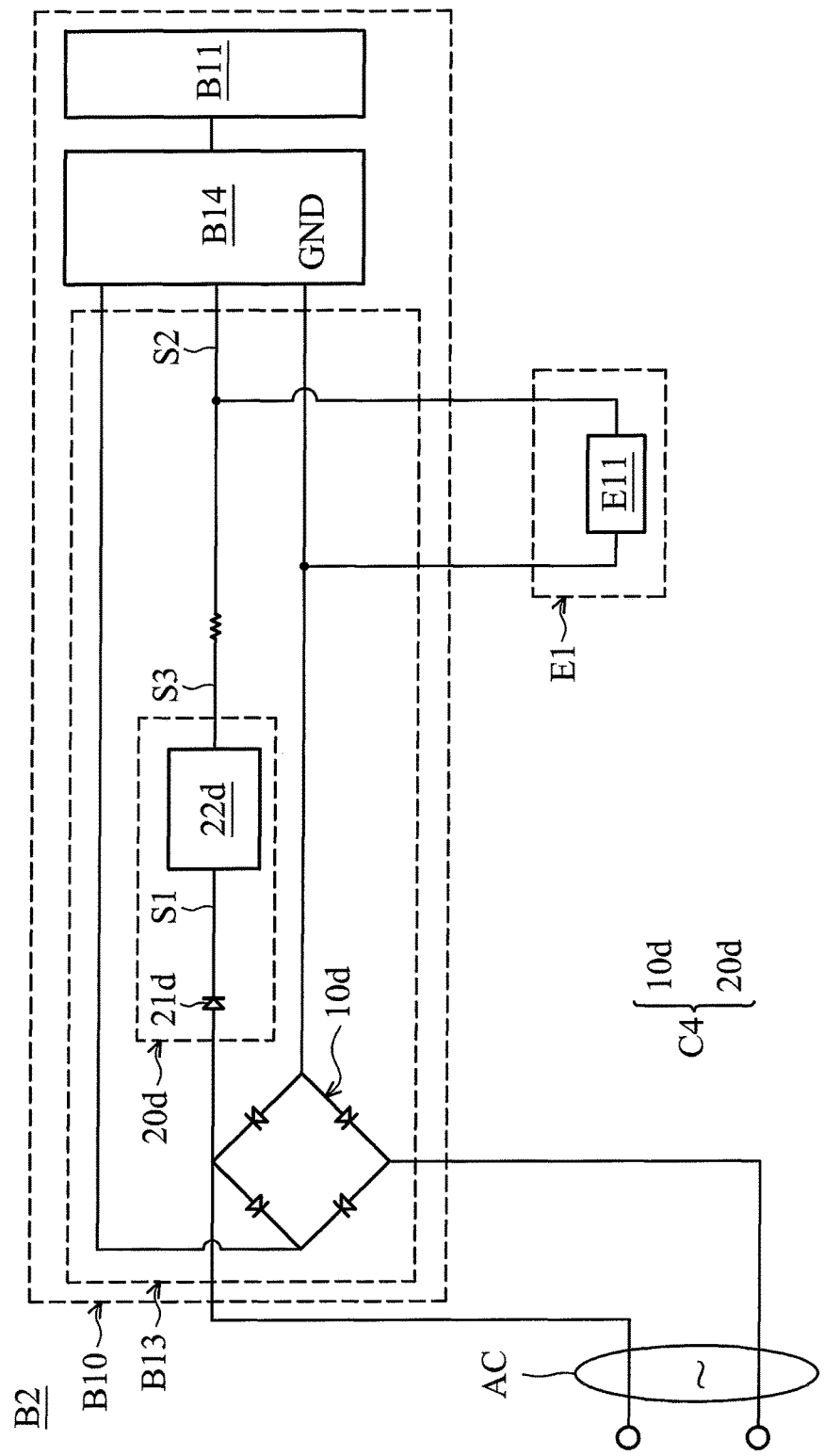
FIG. 4 is a circuit diagram of the fan according to a second embodiment of the present disclosure.

FIG. 4 is a circuit diagram of a fan B2 according to a second embodiment of the present disclosure. In the embodiment, the power control module B13 includes a converting circuit C4 including a rectifier circuit 10d and a modulator module 20d. The modulator module 20d includes a diode 21d and a modulator circuit 22d. The diode 21d receives the AC power source AC and generates a trigger signal S1. The trigger signal S1 may be a direct current. The modulator circuit 22d may be a buck converter for decreasing the voltage of the trigger signal S1. The modulator circuit 22d receives the trigger signal S1 and generates an initial signal S3. In the embodiment, the voltage of the trigger signal S1 is greater than the voltage of the initial signal S3. For example, the voltage of the trigger signal S1 is 155v, and the voltage of the initial signal S3 is 15V.

The operation module E1 is coupled to the modulator circuit 22d of the modulator module 20d and the motor controller B14. The operation module E1 transforms the initial signal S3 to the rotation-speed signal S2 according to an operation event. The DC motor B11 is driven at a corresponding rotation speed according to the rotation-speed signal S2, and drives the rotating impeller A30.

For example, the operation module E1 may be a resistive switch having a variable resistor E11. The operation event may be generated by rotating the resistive switch to adjust the resistance value of the variable resistor E11, and the voltage of the rotation-speed signal S2 is adjusted according to the resistance value. For example, the voltage of the rotation-speed signal S2 is from 2V to 5.5V. The DC motor B11 is driven at a corresponding rotation speed according to the voltage of the rotation-speed signal S2. For example, the rotation speed of the DC motor B11 is adjustable from 2000 to 5000 revolutions per second.

Therefore, by replacing the operation module A40 of the first embodiment with the operation module E1 of the second embodiment, the DC motor B11 has continuously variable speed by continuously rotating the operation module E1.

Figure 5:
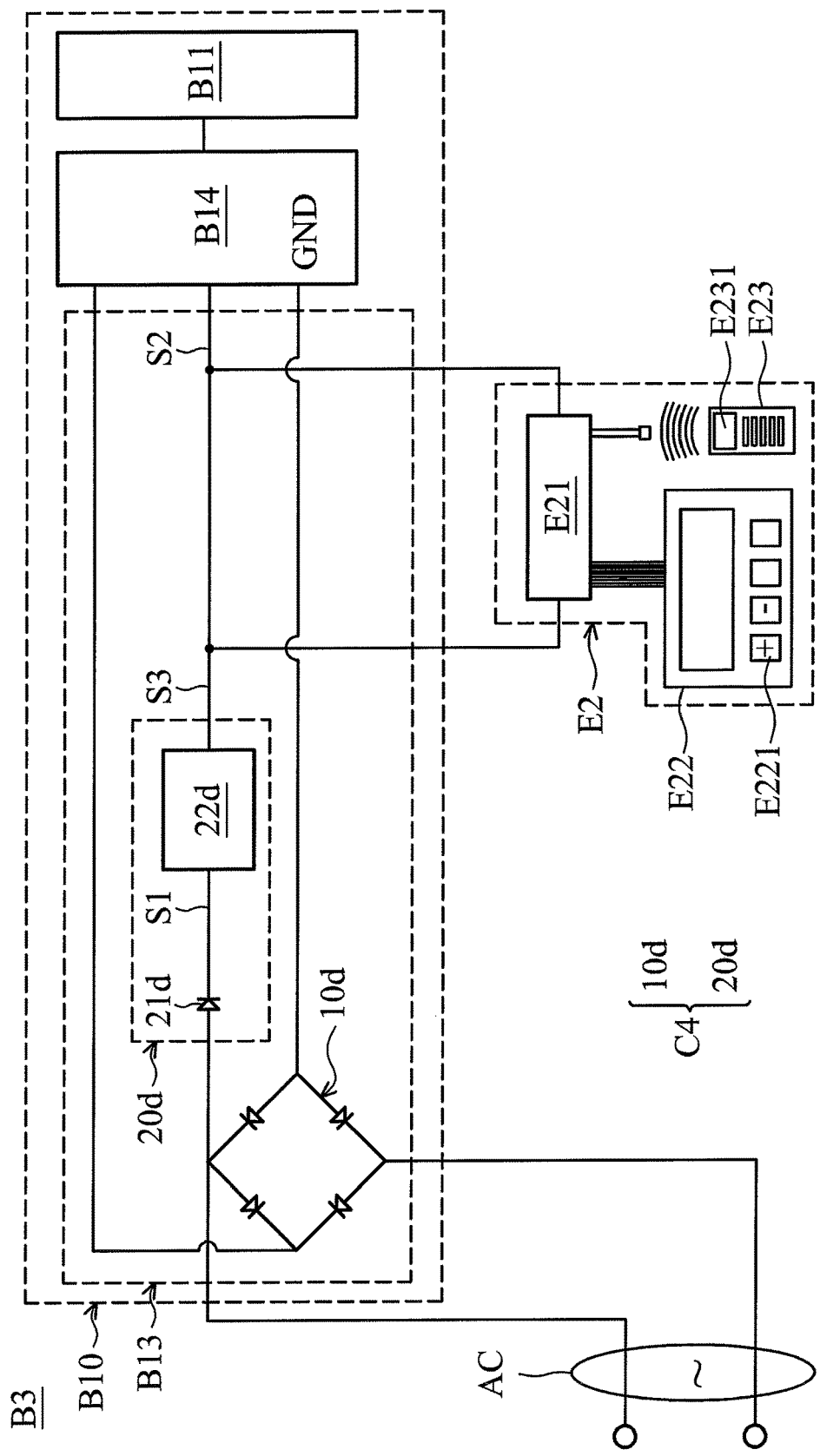
FIG. 5 is a circuit diagram of the fan according to a third embodiment of the present disclosure.

FIG. 5 is a circuit diagram of the fan B3 according to a third embodiment of the present disclosure. The differences of the third embodiment and the second embodiment are described as follows. The operation module E2 includes a signal processor E21, an operation interface E22, and a remote controller E23. The signal processor E21 may be a microcontroller unit. The signal processor E21 is coupled to the modulator circuit 22d and the motor controller B14, and receives the initial signal S3. The operation interface E22 is coupled to the signal processor E21 and applies an operation signal to the signal processor E21 according to an operation event. The remote controller E23 generates a wireless signal according to an operation event, and transmits the wireless signal to the signal processor E21. The signal processor E21 transforms the initial signal S3 to the rotation-speed signal S2 according to the operation signal and/or wireless signal.

For example, the operation interface E22 includes a plurality of buttons E221. A user selectively presses one of the buttons E221 to generate the operation event. The remote controller E23 may be a smart phone or a tablet computer. The user may generate an operation event by touching the touch screen E231 of the remote controller E23. Thus, the operation of the fan B3 is made convenient by the operation module E2. In another embodiment, the signal processor E21 is disposed on the power control module B13.

In conclusion, a fan of the present disclosure is made by replacing the AC motor in the AC fan with the variable-frequency motor device, and thus the manufacturing cost of the fan is decreased.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A variable-frequency motor device that runs on alternating current and is coupled to an operation module, the variable-frequency motor device comprising:
   a first converting circuit, comprising:
      a first rectifier circuit, receiving the alternating current, generating a first direct current; and a first modulator module, receiving the alternating current, generating a first rotation-speed signal;

a second converting circuit, comprising:
- a second rectifier circuit, receiving the alternating current, generating a second direct current; and
- a second modulator module, receiving the alternating current, generating a second rotation-speed signal; and a DC motor, receiving the first direct current or the second direct current, driven at a corresponding rotation speed according to the first rotation-speed signal or the second rotation-speed signal, wherein the operation module is a mechanical switch and includes a main contact point coupled to an alternating-current power source, a first contact point coupled to the first converting circuit, and a second contact point coupled to the second converting circuit, and wherein when the main contact point is coupled to the first contact point, the alternating current is applied to the first converting circuit via the operation module, and when the main contact point is coupled to the second contact point, the alternating current is applied to the second converting circuit via the operation module.

2. The variable-frequency motor device as claimed in claim 1, wherein a voltage of the first rotation-speed signal is different from a voltage of the second rotation-speed signal.

3. The variable-frequency motor device as claimed in claim 1, wherein the first modulator module comprises:
- a first diode, receiving the alternating current, generating a first trigger signal; and
- a first modulator circuit, receiving the first trigger signal, generating the first rotation-speed signal.

4. The variable-frequency motor device as claimed in claim 3, wherein a voltage of the first trigger signal is different from a voltage of the first rotation-speed signal.

5. The variable-frequency motor device as claimed in claim 3, wherein the first modulator circuit is a pulse-width modulation circuit, a voltage-divider circuit, or an operation-amplifier circuit.

6. The variable-frequency motor device as claimed in claim 1, wherein the second modulator module comprises:
- a second diode, receiving the alternating current, generating a second trigger signal; and
- a second modulator circuit, receiving the second trigger signal, generating the second rotation-speed signal.

7. The variable-frequency motor device as claimed in claim 6, wherein a voltage of the second trigger signal is different from a voltage of the second rotation-speed signal.

8. The variable-frequency motor device as claimed in claim 6, wherein the second modulator circuit is a pulse-width modulation circuit, a voltage-divider circuit, or an operation-amplifier circuit.

9. A fan that runs on alternating current, comprising:
- a variable-frequency motor device as claimed in claim 1;
- the operation module coupled to the variable-frequency motor device; and
- an impeller pivoted on the DC motor of the variable-frequency motor device, wherein when the operation module is located at a first rotation-speed position, the DC motor drives the impeller to rotate at a first rotation speed according to the first rotation-speed signal, and wherein when the operation module is located at a second rotation-speed position, the DC motor drives the impeller to rotate at a second rotation speed according to the second rotation-speed signal.

* * * * *